Patented Dec. 14, 1937

2,101,939

UNITED STATES PATENT OFFICE 2,101,939

COOKING OR EXTRACTING PROCESS

Max Groeck, Berlin, Germany, assignor to Hydro-Groeck G. m. b. H., Berlin, Germany No Drawing. Application May 21, 1937, Serial No. 143,976. In Germany February 26, 1935

7 Claims. (Cl. 99—100)

My invention relates to a cooking process for foodstuffs and more especially plants including vegetables, tea, coffee, cocoa, etc., and to the preparation of foodstuffs including soups or beverages like beer and particularly drinks with hot water. It is more especially intended to solve the problem of retaining, in the water used in the cooking of such foodstuffs and beverages, the alkaline earth metal salts and quite particularly the calcium salts, which are known to play a very important role, from a hygienic point of view, in the plants and in the extracts and solutions prepared from them. On the other hand the bicarbonates of calcium and magnesium present as a rule in the drinking water exert an obnoxious influence in the preparation of foods and beverages, if the water, and quite especially water of great hardness, is heated to boiling or is even kept boiling during some time. In such a case not only the color of the food or beverage is influenced unfavorably by the carbonates, which separate out, but there occur also reactions of the carbonates with the aromatic substances contained in the foodstuffs, whereby the quality of these latter is deteriorated. Aside from this the vessels which are permanently used for boiling water, are soon covered with a layer of scale which involves a greater consumption of fuel and cooking time. The most important drawback however consists in the removal of the lime from the water whereby the health of the consumers is gravely affected.

According to the present invention I succeed in avoiding these drawbacks by adding to the substances entering into the preparation of foodstuffs and beverages by cooking, and more especially to the water, soluble acid salts of alkali metals, which may belong to the same species as the salts present in the vegetable matter under treatment, which are capable of rendering the alkaline earth metal salts present in or added to the water soluble at an elevated temperature and, on the other hand, of preventing the mineral substances present in the foodstuffs from being extracted during the boiling operation. Together with these acid alkali metal salts I may add other salts and preferably insoluble salts of the alkaline earth metals.

I prefer adding to the water bisulfate of soda either by itself or together with carbonate of calcium.

By adding bisulfate of soda I convert the carbonates of calcium and/or magnesium present in the water into sulfates, which also dissolve appreciably in boiling water, and I at the same time introduce into the water a corresponding quantity of sodium ions which exert a very favorable influence on the health of the consumer and prevent the food from suffering from a lack of sodium, while at the same time greatly improving the taste. The sulfate ions thus added also serve to preserve the sulfur content of the food, which the body utilizes, together with these sulfate ions, in the decomposition of the albuminous matter. The use of bisulfate of soda enables me to dispense the salt to be added in a very simple manner, for instance under the form of tabloids. If desired, the addition may also be effected in an automatic manner. The importance of this invention is not confined to the preservation of the natural lime content of the water to be heated to boiling, but it also enables me to increase the lime content of soft drinking water or distilled water to such an extent as to render them equal to natural hard waters. My invention is therefore of the greatest importance from a hygienic point of view, since it constitutes a simple and inexpensive means of efficiently combating the regional diseases based on the lack of lime in such soft water.

It is not easy to introduce by artificial means into the water either the sulfate or the carbonate hardness, since both the sulfate and carbonate of lime dissolve in cold water only very slowly. However if suitable calcium compounds are added to the water together with bisulfate of soda, any desired hardness can be produced, even in the case where the water is almost or entirely free from lime. On the other hand not all lime compounds can be used together with bisulfate of soda. Calcium hydroxide and calcium oxide render the water very turbid, since the sulfate settles down in insoluble form. If however a mixture of bisulfate of soda and carbonate of lime is added to the water under boiling, there results a clear calcium sulfate solution, which altogether resembles a water having a corresponding natural sulfate hardness.

This latter way of proceeding offers particular advantages. For there is no further need to adapt the additions to the carbonate hardness of the water. I am free to add to the water equivalent quantities of bisulfate of soda and carbonate of lime sufficing for producing any desired hardness, for instance of 20–30 degrees. With a water of this description there is supplied to the body not only a sufficient quantity of lime salts, but I also prevent the extraction of the salts and more especially the calcium and sodium salts from the food and more especially from the vegetable, which extraction is also very deleterious from a hygienic point of view, but has hitherto been unavoidable when using soft water and water containing carbonates in the cooking and the extracting of the raw materials, because I now greatly enrich the water with these salts. Obviously also the lime content in such water is preserved. If it should appear important to also preserve the potassium and magnesium, an excess of which is mostly present in the food, bisulfate of potassium and magnesium carbonate should be added.

I have found that the flavor of foodstuffs and hot drinks prepared in accordance with this invention is considerably improved.

Obviously the salts need not be added to the water, but may also be admixed to the food, for instance to the ground coffee or cocoa, or to substances added to them, either together or separately, provided that these substances are then treated with the boiling water. The conversion then takes place almost instantly.

Various changes may be made in the details disclosed in the foregoing specification without departing from the invention or sacrificing the advantages thereof.

I claim:—

1. The process of cooking or extracting foodstuffs such as vegetables and of preparing beverages by boiling with water, which comprises introducing into the mixture of substances used in the cooking or extracting process a bisulfate of an alkali metal which is capable of rendering alkaline earth metal salts soluble in the boiling water and of preventing the mineral matter present in the raw material from being extracted during boiling.

2. The process of claim 1, in which the alkali metal bisulfate is added to the water.

3. The process of claim 1, in which an alkali metal bisulfate and an insoluble alkaline earth metal salt are added.

4. The process of claim 1, in which bisulfate of soda is added to the mixture to be cooked or extracted.

5. The process of claim 1, in which bisulfate of soda is added to the water used in the cooking or extracting process.

6. The process of claim 1, in which bisulfate of soda and carbonate of lime are added.

7. The process of claim 1, in which bisulfate of soda and carbonate of lime are added to the water used in the cooking or extracting process.

MAX GROECK.